United States Patent
Tung

(10) Patent No.: US 11,445,382 B2
(45) Date of Patent: Sep. 13, 2022

(54) COMMUNICATION ZONE ALLOCATION METHOD OF TERMINAL, DEVICE THEREFOR, AND COMMUNICATION EQUIPMENT

(71) Applicants: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

(72) Inventor: Wei Shin Tung, Guangdong (CN)

(73) Assignees: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

(*) Notice: Subject to any disclaimer, the term of this patent is extended or adjusted under 35 U.S.C. 154(b) by 166 days.

(21) Appl. No.: 16/988,710

(22) Filed: Aug. 9, 2020

(65) Prior Publication Data
US 2022/0046429 A1 Feb. 10, 2022

(51) Int. Cl.
H04W 16/28 (2009.01)
G01S 3/38 (2006.01)
H04B 7/06 (2006.01)

(52) U.S. Cl.
CPC ............ *H04W 16/28* (2013.01); *G01S 3/38* (2013.01); *H04B 7/0617* (2013.01); *H04B 7/0632* (2013.01)

(58) Field of Classification Search
CPC ....... G01S 3/38; H04B 7/0632; H04B 7/0617; H04W 16/28; H04W 72/046
(Continued)

(56) References Cited

U.S. PATENT DOCUMENTS 3,949,400 A 4/1976 Shores
5,856,804 A 1/1999 Turcotte et al.
(Continued)

FOREIGN PATENT DOCUMENTS

CN 107710642 A 2/2016
CN 107070526 A 8/2017
(Continued)

OTHER PUBLICATIONS

Chinese first office action, Application No. 201810195148.3, dated Dec. 20, 2021(15 pages).
(Continued)

*Primary Examiner* — Leila Malek

(57) ABSTRACT

The present disclosure relates to a communication zone allocation method for a terminal. The method includes: controlling antenna array to receive received signals from a target terminal at a plurality of beam angles under the condition of minimum beam width according to a corresponding relationship between beam width, beam angle and antenna array parameters established in advance; determining a direction of the target terminal according to signal quality of the received signals received at the plurality of beam angles; and setting an exclusive communication zone for the target terminal according to the direction of the target terminal and a target beam width required by the target terminal.

15 Claims, 5 Drawing Sheets

--- antenna array may be controlled to receive received signals from a target terminal at a plurality of beam angles under the condition of minimum beam width according to a corresponding relationship between beam width, beam angle and antenna array parameters established in advance. — 101 a direction of the target terminal may be determined according to the signal quality of the received signals received at the plurality of beam angles. — 102 a exclusive communication zone for the target terminal is set according to the direction of the target terminal and a target beam width required by the target terminal. — 103

(58) Field of Classification Search
USPC .......................................................... 375/267
See application file for complete search history.

(56) References Cited

U.S. PATENT DOCUMENTS

| | | |
|---|---|---|
| 6,369,756 B1 | 4/2002 | Wang et al. |
| 2002/0089451 A1 | 7/2002 | Wang et al. |
| 2014/0004869 A1 | 1/2014 | Jung |
| 2015/0326297 A1 | 11/2015 | Petersson et al. |
| 2016/0380354 A1 | 12/2016 | Bozier et al. |
| 2017/0332249 A1 | 11/2017 | Guey et al. |
| 2020/0007219 A1* | 1/2020 | Fellhauer ............. H04B 7/0491 |

FOREIGN PATENT DOCUMENTS

| | | | | |
|---|---|---|---|---|
| CN | 107466108 A | | 12/2017 | |
| CN | 107689824 A | | 2/2018 | |
| CN | 107710506 A | | 2/2018 | |
| CN | 110247689 A | * | 9/2019 | |
| CN | 110380770 A | * | 10/2019 | ............. H04B 7/086 |

OTHER PUBLICATIONS

Chinese second office action, Application No. 201810105148.3, dated May 30, 2022 (16 pages).

\* cited by examiner

```
┌─────────────────────────────────────────────────────────────────┐
│ antenna array may be controlled to receive received signals     │ ~ 101
│ from a target terminal at a plurality of beam angles under the  │
│ condition of minimum beam width according to a corresponding    │
│ relationship between beam width, beam angle and antenna array   │
│ parameters established in advance.                              │
└─────────────────────────────────────────────────────────────────┘
                                │
                                ▼
┌─────────────────────────────────────────────────────────────────┐
│ a direction of the target terminal may be determined according  │ ~ 102
│ to the signal quality of the received signals received at the   │
│ plurality of beam angles.                                       │
└─────────────────────────────────────────────────────────────────┘
                                │
                                ▼
┌─────────────────────────────────────────────────────────────────┐
│ a exclusive communication zone for the target terminal is set   │ ~ 103
│ according to the direction of the target terminal and a target  │
│ beam width required by the target terminal.                     │
└─────────────────────────────────────────────────────────────────┘
```

FIG. 1

```
┌─────────────────────────────────────────────────────────────────┐
│ a first parameter corresponding to the minimum beam width and a │ ~ 1011
│ plurality of second parameters corresponding to the plurality   │
│ of beam angles of the antenna array at the minimum beam width   │
│ is obtained according to the corresponding relationship, and    │
│ the first parameter comprises quantity of antennas, and the     │
│ second parameter comprises phase differences between adjacent   │
│ antennas.                                                       │
└─────────────────────────────────────────────────────────────────┘
                                │
                                ▼
┌─────────────────────────────────────────────────────────────────┐
│ the beam width of the antenna array is controlled according to  │ ~ 1012
│ the first parameter to adjust the beam width of the antenna     │
│ array to the minimum beam width.                                │
└─────────────────────────────────────────────────────────────────┘
                                │
                                ▼
┌─────────────────────────────────────────────────────────────────┐
│ the beam angle of the antenna array is controlled according to  │ ~ 1013
│ the plurality of second parameters to make the antenna array    │
│ receive the received signals at the plurality of beam angles    │
│ in the case of the minimum beam width.                          │
└─────────────────────────────────────────────────────────────────┘
```

FIG. 2

COMMUNICATION ZONE ALLOCATION METHOD OF TERMINAL, DEVICE THEREFOR, AND COMMUNICATION EQUIPMENT

TECHNICAL FIELD

The present disclosure relates to the field of communication technology, and in particular, to a communication zone allocation method of a terminal, a communication zone distribution device of a terminal and a communication equipment.

BACKGROUND

Beamforming is a combination of antenna technology and digital signal processing technology, which is configured to directionally transmit or receive signals. Beamforming is derived from the concept of adaptive antenna. The signal processing at the receiving end can form the desired ideal signal by weighting the signals received by plurality of antenna elements, which is equivalent to forming a concentrated beam from the perspective of antenna pattern. For example, the original omni-directional receiving pattern is converted into a lobe pattern with zero point and maximum direction. The same principle is also applicable to the transmitting end.

In addition, beamforming technology will focus the energy of wireless signal to form a directional beam. Generally, the narrower the beam, the greater the signal gain. However, once the direction of the beam deviates from the user, the user will not receive high-quality wireless signal. Therefore, how to quickly and accurately find the user's direction, and set the appropriate beam for the user, when using beamforming technology for communication, is an urgent problem to be solved.

SUMMARY

In one embodiment, a communication zone allocation method for a terminal is provided. The method includes: controlling antenna array to receive received signals from a target terminal at a plurality of beam angles under the condition of minimum beam width according to a corresponding relationship between beam width, beam angle and antenna array parameters established in advance; determining a direction of the target terminal according signal quality of the received signals received at the plurality of beam angles; and setting an exclusive communication zone for the target terminal according to the direction of the target terminal and a target beam width required by the target terminal.

In the one embodiment, a communication zone distribution device of a terminal is provided. The device includes a processor and a non-transitory program storage medium containing program code executable by the processor, the program code including: a first module configured to control the antenna array to receive the received signals from the target terminal at a plurality of beam angles in the case of the minimum beam width according to the present established corresponding relationship between the beam width, the beam angle and the parameters of the antenna array; a second module configured to determine the direction of the target terminal according to the signal quality of the received signals received at the plurality of beam angles; and a third module configured to set the exclusive communication zone for the target terminal according to the direction in which the target terminal is located and the target beam width required by the target terminal In the one embodiment, a communication equipment is provides. The communication equipment includes a processor, a non-transitory program storage medium and a computer program stored on the non-transitory program storage medium which is run on the processor, wherein the processor executes the computer program to complete operations: controlling antenna array to receive received signals from a target terminal at a plurality of beam angles under the condition of minimum beam width according to a corresponding relationship between beam width, beam angle and antenna array parameters established in advance; determining a direction of the target terminal according to signal quality of the received signals received at the plurality of beam angles; and setting an exclusive communication zone for the target terminal according to the direction of the target terminal and a target beam width required by the target terminal.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration, but not for limitation. It should be understood that, one skilled in the art may acquire other drawings based on these drawings, without making any inventive work.

FIG. 1 is a flow chart of a communication zone allocation method of a terminal according to one exemplary embodiment of the present disclosure.

FIG. 2 is a flow chart of a communication zone allocation method of a terminal according to the exemplary embodiment shown in FIG. 1.

DETAILED DESCRIPTION

Figure 3:
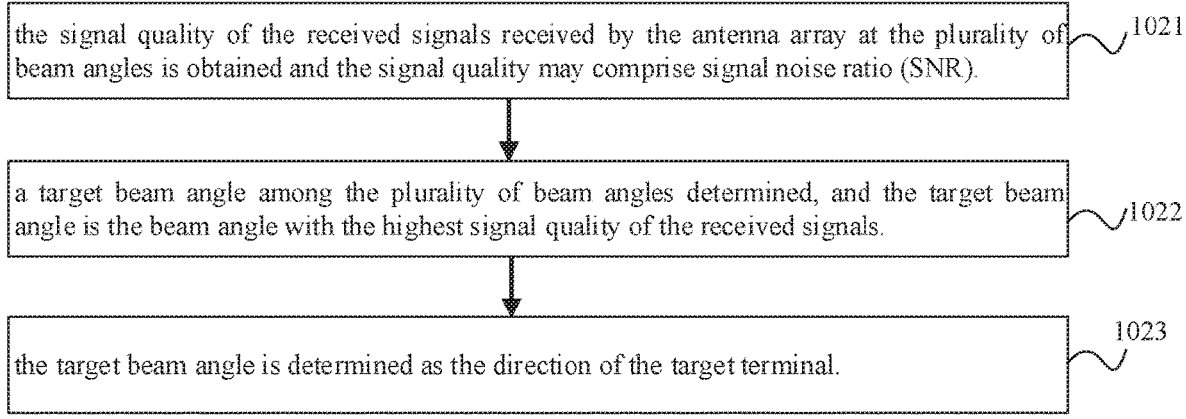
FIG. 3 is a flow chart of a communication zone allocation method of a terminal according to the exemplary embodiment shown in FIG. 1.

In order to facilitate the understanding of the present disclosure, the present disclosure will be described more fully hereinafter with reference to the accompanying drawings. Preferred embodiments of the present disclosure are given in the drawings. However, the present disclosure may be embodied in many different forms and is not limited to the embodiments described herein. Rather, these embodiments are provided so that the present disclosure will be more fully understood.

In the description of embodiments of the invention, the terms "first", "second", "third" and the like are only used for the purpose of description and cannot be understood as indicating or implying relative importance or implicitly indicating the number of indicated technical features. Thus, the features defined as "first", "second", "third" and the like may explicitly or implicitly include one or more of the said features. In the description of embodiments of the invention, "multiple" and "a plurality of" means two or more, unless otherwise specified.

The term "module", as used herein, refers to logic embedded in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processor. The modules described herein may be implemented as either software and/or hardware modules and may be stored in any type of computer-readable medium or other computer storage device.

Before describing a communication zone allocation method of a terminal provided by embodiments of the disclosure, the application scenarios involved in each embodiment of the disclosure are introduced. The application scenarios of various embodiments of the present disclosure may comprise at least two communication equipments. At least one communication equipment is a device supporting multi-antenna transceiver, such as a base station with antenna array, a wireless gateway device or a mobile terminal, and supports beamforming technology. Other communication equipments among the at least two communication equipments can be mobile terminal(s) communicating with the base station or mobile terminal. The mobile terminal (s) can be a single antenna mobile terminal, or a mobile terminal with the same antenna array and supporting beamforming technology. Any of these mobile terminals can be used as a target terminal in the embodiment described below. The above mobile terminals may include but are not limited to smart phones, tablet computers, smart TVs, PDA (personal digital assistant) and portable computers.

The beamforming technology is introduced below. Beam forming technology is actually based on the idea of space division multiple access (SDMA) to improve the utilization of spectrum resources of users. In wireless communication, when a wireless signal radiates in all directions in space, only a small part of signal energy in one direction is received by the receiver as useful signal. Most of the signals are not received by the corresponding receivers, but radiate to receivers in other directions and become interference signals. The idea of space division multiple access is to make the electromagnetic wave propagate in a specific direction, so that users in different directions can use all spectrum resources to communicate continuously. With the development of MIMO (Multiple-Input Multiple-Output) technology, beamforming technology has been widely used. The MIMO technology is the use of large-scale transmit antenna array at the transmitter and/or the use of large-scale receiving antenna array at the receiver to transmit signals through the antenna array at the transmitter or receive signals through the antenna array at the receiver, so as to improve the communication quality. Therefore, through the above communication equipment with antenna array, by controlling relevant attribute parameters of antenna array, appropriate beam can be set at the transmitting end and/or receiving end, so as to obtain better communication quality.

The communication zone allocation method of the terminal provided by one embodiment of the present disclosure is described below.

Referring to FIG. 1, FIG. 1 is a flow chart of a communication zone allocation method of a terminal of one embodiment of the present disclosure. As shown in FIG. 1, the method can be applied to a communication equipment, which can be the communication equipment with antenna array and supporting beamforming technology, such as a base station, a wireless gateway or a mobile terminal. The method can include operations at blocks illustrated in FIG. 1.

At block 101, antenna array may be controlled to receive received signals from a target terminal at a plurality of beam angles under the condition of minimum beam width according to a corresponding relationship between beam width, beam angle and antenna array parameters established in advance.

In the embodiment, the corresponding relationship between the beam width, beam angle and the antenna array parameters can adopt the corresponding table. The corresponding table between the beam width, beam angle and the antenna array parameters (such as antenna number, phase difference between adjacent antennas, etc.) can be established in advance.

When the current communication equipment, such as the base station with antenna array, wireless gateway equipment or mobile terminal, needs to establish a exclusive communication zone for the target terminal, the allowable minimum beam width of the antenna array of the current communication equipment and the parameters of the antenna array corresponding to the minimum beam width can be determined according to the corresponding relationship established in advance. Thus, the parameters of the antenna array can be configured to control the antenna array to make the antenna beam width be the minimum beam width. At the same time, each the plurality of beam angles that the antenna array can radiate in the case of minimum beam width can be obtained according to the corresponding relationship. Thus, the antenna array can be controlled to receive the received signals from the target terminal at each the plurality of beam angles with the minimum beam width.

At block 102, a direction of the target terminal may be determined according to the signal quality of the received signals received at the plurality of beam angles.

In the embodiment, since the radiation energy is controlled to a beam in a specific direction through beamforming technology, the narrower the beam width is, the higher the gain of radiation energy is. Thus, the quality of transmitted and received signals in this direction is better. On the other hand, the narrower the beam width is, the smaller the scanning granularity of the beam angle is. Therefore, the more accurate the direction of the target terminal is determined by scanning each the plurality of beam angles with the minimum beam width. Therefore, the direction of the target terminal can be confirmed by finding the beam angle with the best signal quality according to the signal quality of the received signals received at the plurality of beam angles.

At block 103, a exclusive communication zone for the target terminal is set according to the direction of the target terminal and a target beam width required by the target terminal.

In the embodiment, the exclusive communication zone is set for the target terminal by combining the direction of the target terminal, i.e., the beam angle with the best signal quality of the received signals, and the target beam width. The exclusive communication zone set for the target terminal described in various embodiments of the present disclosure can be understood as an zone suitable for communication of the target terminal set specifically for the direction of the target terminal and the required beam width of the target terminal. Since the scope of the exclusive communication zone can be freely set according to the direction of the target terminal and the required beam width, the current communication equipment can freely set the exclusive communication channel in accordance with the required angle and scope between the communication equipment and the target terminal.

In addition, it should be noted that on the basis of the above antenna number and phase difference are illustrative. The parameters comprises but is not limited to these two parameters, more parameters can be introduced according to actual needs to further set the formed beam, such as amplitude, gain, etc.

Therefore, through the above technical scheme, the current communication equipment can quickly and accurately find the direction of the target terminal, and set appropriate beam width for the target terminal according to the direction of the target terminal, so as to form a exclusive communication zone for the target terminal. The exclusive communication zone in accordance with the required angle and scope between the communication equipment and the target terminal can be freely set, which can reduce the interference between the target terminal and other communication terminals and improve the communication quality.

Referring to FIG. 2, FIG. 2 is a flow chart of a communication zone allocation method for a terminal according to the embodiment shown in FIG. 1. The method according to the operation at block 101 can further include operations at blocks illustrated in FIG. 2.

At block 1011, a first parameter corresponding to the minimum beam width and a plurality of second parameters corresponding to the plurality of beam angles of the antenna array at the minimum beam width is obtained according to the corresponding relationship, and the first parameter comprises quantity of antennas, and the second parameter comprises phase differences between adjacent antennas.

At block 1012, the beam width of the antenna array is controlled according to the first parameter to adjust the beam width of the antenna array to the minimum beam width.

At block 1013, the beam angle of the antenna array is controlled according to the plurality of second parameters to make the antenna array receive the received signals at the plurality of beam angles in the case of the minimum beam width.

Beamforming technology mainly uses the principle of wave interference, that is, when two waves generated by two wave sources interfere with each other, the two waves in some directions reinforce each other, and the two waves in other directions just cancel each other. In beamforming technology, each antenna of antenna array is a wave source, so there are many wave sources in the antenna array. By precisely controlling relative phase between the electromagnetic waves transmitted or received by the wave sources, the transmitting or receiving gain of electromagnetic waves can be concentrated in one direction (i.e. the position of the receiver or transmitter), while the transmitting/receiving gain of the electromagnetic wave in other positions is very small (i.e., the interference to other receivers is reduced/the chance of being interfered by other transmitters is reduced). In addition, in beamforming technology, the more antennas are used, the narrower the beam width is.

Therefore, in the corresponding relationship, the number of antennas corresponding to the minimum beam width is the maximum number of antennas of the antenna array, so the antenna array can be controlled to form beams with the minimum beam width according to the number of antennas. And under the condition of minimum beam width, the phase difference between adjacent antennas corresponding to each the plurality of beam angles under the condition of minimum beam width in the corresponding relationship is obtained to traverse each the plurality of beam angles. Thus, the antenna array can receive the received signals from the target terminal at the plurality of beam angles in the case of minimum beam width.

Referring to FIG. 3, FIG. 3 is a flow chart of a communication zone allocation method of a terminal according to the embodiment shown in FIG. 1. The method according to the operation at block 102 can further include operations at blocks illustrated in FIG. 3.

At block 1021, the signal quality of the received signals received by the antenna array at the plurality of beam angles is obtained and the signal quality may comprise signal noise ratio (SNR).

The higher the SNR, the higher the signal quality. Besides SNR, other parameters can also be considered.

At block 1022, a target beam angle among the plurality of beam angles determined, and the target beam angle is the beam angle with the highest signal quality of the received signals.

At block 1023, the target beam angle is determined as the direction of the target terminal.

Figure 4:
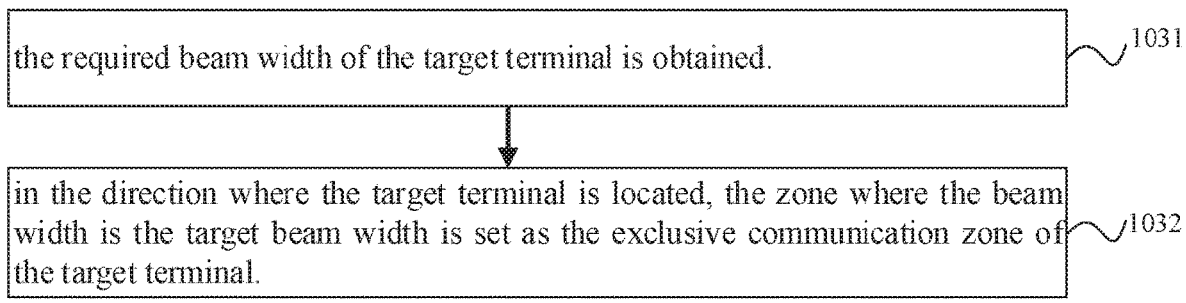
FIG. 4 is a flow chart of a communication zone allocation method of a terminal according to the exemplary embodiment shown in FIG. 1.

Referring to FIG. 4, FIG. 4 is a flow chart of a communication zone allocation method of a terminal according to the embodiment shown in FIG. 1. The method according to the operation at block 103 can further include operations at blocks illustrated in FIG. 4.

At block 1031, the required beam width of the target terminal is obtained.

At block 1032, in the direction where the target terminal is located, the zone where the beam width is the target beam width is set as the exclusive communication zone of the target terminal.

The operation at block 1031 can be realized by the following two methods:

The first method is to receive the target beam width transmitted by the target terminal.

The second method is to obtain a terminal model of the target terminal and obtain a preset beam width corresponding to the terminal model as the target beam width.

That is to say, the target beam width required by the target terminal can be set by the target terminal. Thus, the current communication equipment can receive the target beam width sent by the target terminal, or the target beam width can be preset in the current communication equipment. For example, the beam width required for different terminal models is preset in the current communication equipment. Correspondingly, the current communication equipment can first obtain the terminal model of the target terminal, and then obtain the preset beam width corresponding to the terminal model of the target terminal as the target beam width.

In summary, through the above technical scheme, the current communication equipment can quickly and accurately find the direction of the target terminal, and set the appropriate beam width for the target terminal according to the direction of the target terminal. Thus, a exclusive communication zone for the target terminal can be formed. And the exclusive communication channel in accordance with the required angle and range can be set freely between the communication equipment and the target terminal to reduce the interference between the target terminal and other communication terminals and improve the communication quality.

Figure 5:
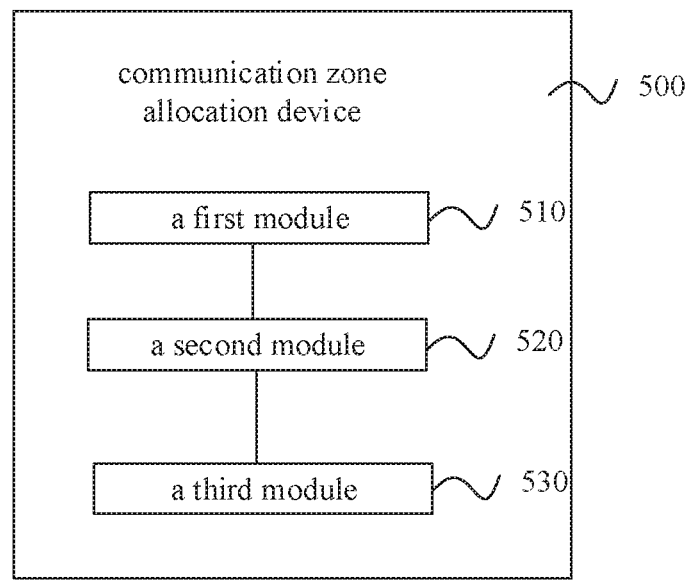
FIG. 5 is a block diagram of a communication zone allocation device of a terminal according to one exemplary embodiment.

FIG. 5 is a block diagram of a communication zone allocation device of a terminal according to one exemplary embodiment. Referring to FIG. 5, the device 500 may comprise: a first module 510, a second module 520 and a third module 530.

The first module 510 is configured to control the antenna array to receive the received signals from the target terminal at a plurality of beam angles in the case of the minimum beam width according to the present established corresponding relationship between the beam width, the beam angle and the parameters of the antenna array.

The second module 520 is configured to determine the direction of the target terminal according to the signal quality of the received signals received at the plurality of beam angles.

The third module 530 is configured to set the exclusive communication zone for the target terminal according to the direction in which the target terminal is located and the target beam width required by the target terminal.

Figure 6:
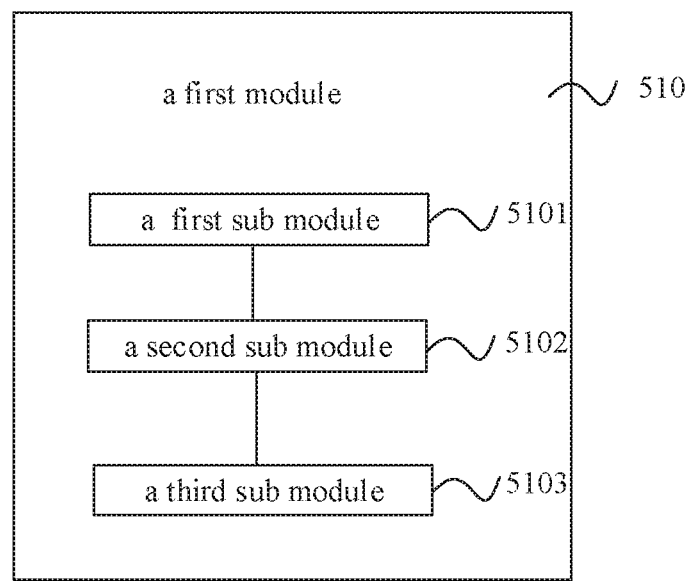
FIG. 6 is a block diagram of a first module according to the embodiment shown in FIG. 5.

FIG. 6 is a block diagram of a first module according to the embodiment shown in FIG. 5. Referring to FIG. 6, the first module 510 may comprise a first sub module 5101, a second sub module 5102 and a third sub module 5103

The first sub module 5101 is configured to obtain the first parameter corresponding to the minimum beam width and a plurality of second parameters corresponding to the plurality of beam angles of the antenna array at the minimum beam width according to the corresponding relationship, and the first parameter comprising the number of antennas, and the second parameter comprising the phase difference between adjacent antennas.

The second sub module 5102 is configured to control the beam width of the antenna array according to the first parameter to adjust the beam width of the antenna array to the minimum beam width.

The third sub module 5103 is configured to control the beam angle of the antenna array according to the plurality of second parameters to make the antenna array receive the received signals at the plurality of beam angles in the case of the minimum beam width.

Figure 7:
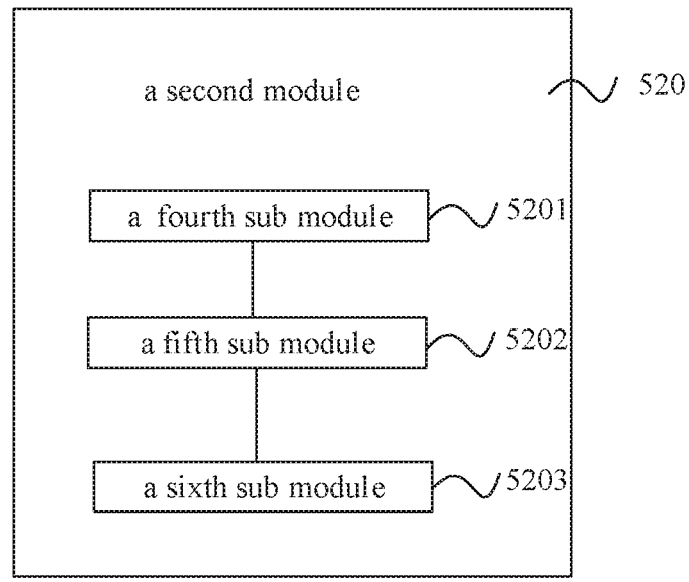
FIG. 7 is a block diagram of a second module according to the embodiment shown in FIG. 5.

Referring to FIG. 7, FIG. 7 is a block diagram of a second module according to the embodiment shown in FIG. 5. As shown in FIG. 7, the second module 520 may comprise a fourth sub module 5201, a fifth sub module 5202 and a sixth sub module 5203.

The fourth sub module 5201 is configured to obtain the signal quality of the received signals received by the antenna array at the plurality of beam angles, and the signal quality comprising the signal-to-noise ratio.

The fifth sub module 5202 is configured to determine the target beam angle among the plurality of beam angles, and the target beam angle being the beam angle with the highest signal quality of the received signals.

The sixth sub module 5203 is configured to determine the direction of the target terminal according to the target beam angle.

Figure 8:
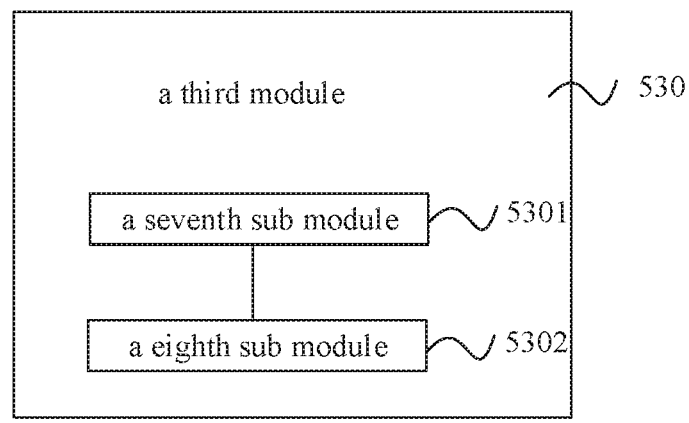
FIG. 8 is a block diagram of a third module according to the embodiment shown in FIG. 5.

Referring to FIG. 8, FIG. 8 is a block diagram of a third module according to the embodiment shown in FIG. 5. As shown in FIG. 8, the third module 530 may comprise a seventh sub module 5301 and a eighth scab module 5302.

The seventh sub module 5301 is configured to obtain the beam width required by the target terminal.

The eighth sub module 5302 is configured to set the zone where the beam width is the target beam width in the direction where the target terminal is located as the exclusive communication zone of the target terminal.

Alternatively, the seventh sub module 5301 is configured to receive the target beam width transmitted by the target terminal or acquire the terminal model of the target terminal. Or the seventh sub module 5301 is configured to acquire the terminal model of the target terminal and obtain the preset beam width corresponding to the terminal model as the target beam width.

Through the above technical scheme, the current communication equipment can quickly and accurately find the direction of the target terminal, and set the appropriate beam width for the target terminal according to the direction of the target terminal. Thus, a exclusive communication zone for the target terminal can be formed. And the exclusive communication channel in accordance with the required angle and range can be set freely between the communication equipment and the target terminal to reduce the interference between the target terminal and other communication terminals and improve the communication quality.

Regarding to the device in the above embodiment, the specific operation mode of each module has been described in detail in the embodiment of the method. Thus, the specific operation mode of each module will not be described in detail here.

Figure 9:
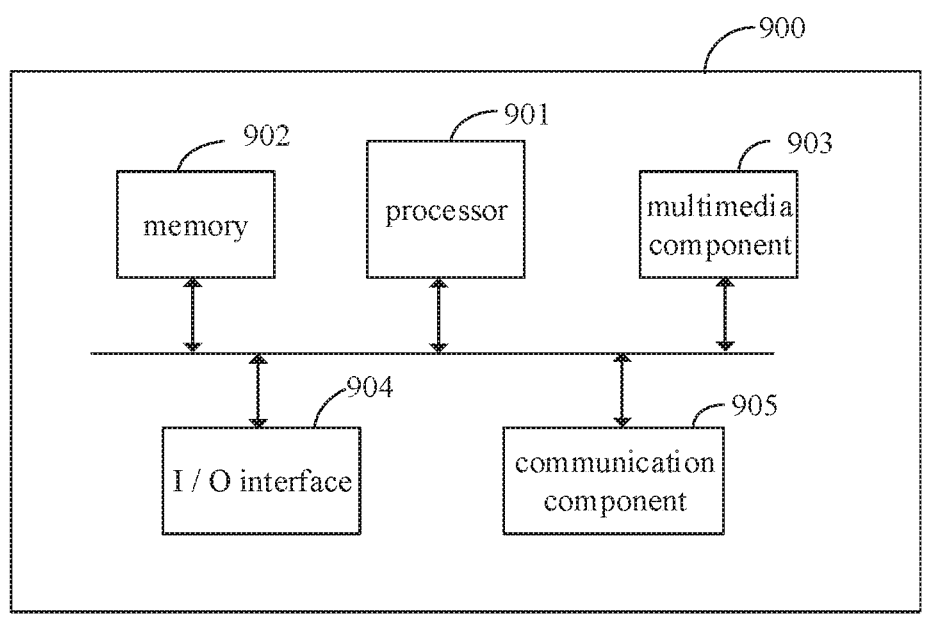
FIG. 9 is a block diagram of a communication equipment according to another exemplary embodiment.

Referring to FIG. 9, FIG. 9 is a block diagram of a communication equipment according to another exemplary embodiment. The communication equipment 900 may be a communication equipment supporting multi-antenna transceiver described above, such as a base station with an antenna array, a wireless gateway device or a mobile terminal, and supports beamforming technology. Besides, the communication equipment 900 may be configured to perform any of the communication zone allocation method of the terminal shown in FIGS. 1 to 4. As shown in FIG. 9, the communication equipment 900 may comprise a processor 901 and a non-transitory program storage medium 902. The communication equipment 900 may also comprise one or more of multimedia component 903, input/output (I/O) interface 904, and communication component 905.

The processor 901 is configured to control the overall operation of the communication equipment 900 to complete all or part of the steps in the communication zone allocation method of the terminal. The non-transitory program storage medium 902 is configured to store various types of data to support operation on the communication equipment 900. The various types of data may comprise, for example, any application program or instructions for the method operating on the communication equipment 900, and data related to application program, such as contact data, messages received and transmitted, pictures, audio, video, etc. The non-transitory program storage medium 902 can be realized by any type of volatile or nonvolatile storage devices or their combination, such as static random access memory (SRAM), electrically erasable programmable read-only memory (EEPROM), erasable programmable read-only Memory (EPROM), programmable read-only memory (PROM), read only memory (ROM), magnetic memory, flash memory, disk or optical disk. The multimedia component 903 may comprise a screen and an audio component. The screen may be a touch screen. The audio component is used for outputting and/or inputting audio signals. For example, the audio component may comprise a microphone for receiving external audio signals. The received audio signal may be further stored in the non-transitory program storage medium 902 or transmitted through the communication component 905. The audio component also comprises at least one speaker for outputting audio signals. The I/O interface 904 provides an interface between the processor 901 and other interface modules. Other interface modules can be keyboards, mouses, buttons, etc. These buttons can be virtual or physical. The communication component 905 is used for wired or wireless communication between the communication equipment 900 and other equipments. Wireless communication can be, such as Wi Fi, Bluetooth, near field communication (NFC), 2G, 3G or 4G, or one or more of them, so the corresponding communication component 905 can comprise: Wi Fi module, Bluetooth module, NFC module.

In an exemplary embodiment, the communication equipment 900 may be realized to carry out the communication zone allocation method of the terminal mentioned above by one or more application specific integrated circuits (ASIC), digital signal processor (DSP), digital signal processing device (DSPD) and programmable logic device (PLD), field programmable gate array (FPGA), controller, microcontroller, microprocessor or other electronic components.

In another exemplary embodiment, a computer-readable storage medium comprising program instructions is provided. When the program instructions are executed by the processor, the steps of the communication zone allocation method of the terminal described above are realized. For example, the computer-readable storage medium may be the non-transitory program storage medium 902 comprising the above program instructions. The program instructions can be executed by the processor 901 of the communication equipment 900 to complete the communication zone allocation method of the terminal described above.

The technical features of the above-described embodiments can be arbitrarily combined. In order to make the description brief, not all possible combinations of the respective technical features in the above-described embodiments are described. As long as there is no contradiction in the combination of these technical features, it should be considered within the scope of present disclosure.

The above-described embodiments are merely illustrative of several embodiments of the present disclosure, and the description thereof is specific and detailed. The above embodiments cannot be construed to limit the present disclosure. It should be noted that, a number of variations and modifications may be made by those skilled in the art without departing from the spirit and scope of the disclosure. Therefore, the scope of the present disclosure should be subject to the appended claims.

What is claimed is:

1. A communication zone allocation method for a terminal, the method comprising:
controlling antenna array to receive received signals from a target terminal at a plurality of beam angles under the condition of minimum beam width according to a corresponding relationship between beam width, beam angle and antenna array parameters established in advance;
determining a direction of the target terminal according to signal quality of the received signals received at the plurality of beam angles; and
setting an exclusive communication zone for the target terminal according to the direction of the target terminal and a target beam width required by the target terminal.

2. The method according to claim 1, wherein the controlling antenna array to receive received signals comprises:
obtaining a first parameter corresponding to the minimum beam width and a plurality of second parameters corresponding to the plurality of beam angles of the antenna array at the minimum beam width according to the corresponding relationship, wherein the first parameter comprises quantity of antennas, and the plurality of second parameters comprise phase differences between adjacent antennas;
controlling the beam width of the antenna array according to the first parameter to adjust the beam width of the antenna array to the minimum beam width; and
controlling the beam angle of the antenna array according to the plurality of second parameters to make the antenna array receive the received signals at the plurality of beam angles in the case of the minimum beam width.

3. The method according to claim 1, wherein the determining the direction of the target terminal according to the signal quality of the received signals received at the plurality of beam angles comprises:
obtaining signal quality of the received signals received by the antenna array at the plurality of beam angles, wherein the signal quality comprises signal-to-noise ratio;
determining a target beam angle among the plurality of beam angles, wherein the target beam angle is the beam angle with the highest signal quality of the received signals; and
determining the target beam angle as the direction of the target terminal.

4. The method according to claim 1, wherein the setting the exclusive communication zone for the target terminal comprises:
obtaining required beam width of the target terminal; and
setting a zone where the beam width is the target beam width in the direction where the target terminal is located as the exclusive communication zone of the target terminal.

5. The method according to claim 4, wherein the obtaining the required beam width of the target terminal comprises:
receiving the target beam width transmitted by the target terminal; or
obtaining a terminal model of the target terminal; and
obtaining a preset beam width corresponding to the terminal model as the target beam width.

6. A communication zone distribution device of a terminal, the device comprising a processor and a non-transitory program storage medium containing program code executable by the processor, the program code comprising:
a first module configured to control antenna array to receive received signals from a target terminal at a plurality of beam angles in case of minimum beam width according to a corresponding relationship established in advance between beam width, beam angle and parameters of the antenna array;
a second module configured to determine the direction of the target terminal according to signal quality of the received signals received at the plurality of beam angles; and
a third module configured to set an exclusive communication zone for the target terminal according to the direction in which the target terminal is located and a target beam width required by the target terminal.

7. The device according to the claim 6, wherein the first module comprises:
a first sub module configured to obtain a first parameter corresponding to the minimum beam width and a plurality of second parameters corresponding to the plurality of beam angles of the antenna array at the minimum beam width according to the corresponding relationship, wherein the first parameter comprises the number of antennas, and the plurality of second parameters comprise phase differences between adjacent antennas;
a second sub module configured to control the beam width of the antenna array according to the first parameter to adjust the beam width of the antenna array to the minimum beam width; and
a third sub module configured to control the beam angle of the antenna array according to the plurality of second parameters to make the antenna array receive the received signals at the plurality of beam angles in the case of the minimum beam width.

8. The device according to the claim 6, wherein the second module comprises:
a fourth sub module configured to obtain the signal quality of the received signals received by the antenna array at the plurality of beam angles, and the signal quality comprising the signal-to-noise ratio;
a fifth sub module configured to determine a target beam angle among the plurality of beam angles, and the target beam angle being the beam angle with the highest signal quality of the received signals; and
a sixth sub module configured to determine the direction of the target terminal according to the target beam angle.

9. The device according to the claim 6, wherein the third module comprises:
a seventh sub module configured to obtain the beam width required by the target terminal; and
a eighth sub module configured to set a zone where the beam width is the target beam width in the direction where the target terminal is located as the exclusive communication zone of the target terminal.

10. The device according to the claim 9, wherein the seventh sub module is configured to:
receive the target beam width transmitted by the target terminal; or
acquire a terminal model of the target terminal; and
obtain a preset beam width corresponding to the terminal model as the target beam width.

11. A communication equipment, wherein the communication equipment comprises a processor, a non-transitory program storage medium and a computer program stored on the non-transitory program storage medium which is run on the processor, wherein the processor executes the computer program to complete operations:
controlling antenna array to receive received signals from a target terminal at a plurality of beam angles under the condition of minimum beam width according to a corresponding relationship between beam width, beam angle and antenna array parameters established in advance;
determining a direction of the target terminal according to signal quality of the received signals received at the plurality of beam angles; and
setting an exclusive communication zone for the target terminal according to the direction of the target terminal and a target beam width required by the target terminal.

12. The communication equipment according to the claim 11, wherein the controlling antenna array to receive received signals comprises:
obtaining a first parameter corresponding to the minimum beam width and a plurality of second parameters corresponding to the plurality of beam angles of the antenna array at the minimum beam width according to the corresponding relationship, wherein the first parameter comprises quantity of antennas, and the plurality of second parameters comprise phase differences between adjacent antennas;
controlling the beam width of the antenna array according to the first parameter to adjust the beam width of the antenna array to the minimum beam width; and
controlling the beam angle of the antenna array according to the plurality of second parameters to make the antenna array receive the received signals at the plurality of beam angles in the case of the minimum beam width.

13. The communication equipment according to the claim 11, wherein the determining the direction of the target terminal according to the signal quality of the received signals received at the plurality of beam angles comprises:
obtaining signal quality of the received signals received by the antenna array at the plurality of beam angles, wherein the signal quality comprises signal-to-noise ratio;
determining a target beam angle among the plurality of beam angles, wherein the target beam angle is the beam angle with the highest signal quality of the received signals; and
determining the target beam angle as the direction of the target terminal.

14. The communication equipment according to the claim 11, wherein the setting the exclusive communication zone for the target terminal comprises:
obtaining required beam width of the target terminal; and
setting a zone where the beam width is the target beam width in the direction where the target terminal is located as the exclusive communication zone of the target terminal.

15. The communication equipment according to the claim 14, wherein the obtaining the required beam width of the target terminal comprises:
receiving the target beam width transmitted by the target terminal; or
obtaining a terminal model of the target terminal; and
obtaining a preset beam width corresponding to the terminal model as the target beam width.

* * * * *